United States Patent
Harmon et al.

(10) Patent No.: US 7,142,667 B2
(45) Date of Patent: Nov. 28, 2006

(54) SELF OPERATING OPENING MECHANISM FOR USE IN HAND-HELD ELECTRONIC DEVICE

(75) Inventors: Roger Harmon, Crystal Lake, IL (US); Benjamin Finney, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 383 days.

(21) Appl. No.: 10/331,525

(22) Filed: Dec. 30, 2002

(65) Prior Publication Data
US 2004/0204015 A1    Oct. 14, 2004

(51) Int. Cl.
*H04M 1/00* (2006.01)
*H04M 9/00* (2006.01)
*H04B 1/38* (2006.01)

(52) U.S. Cl. ............... 379/433.13; 455/90.3; 455/575.3

(58) Field of Classification Search ........... 379/433.12, 379/433.13, 428.01; 455/90.1–90.3, 575.1–575.4
See application file for complete search history.

(56) References Cited

U.S. PATENT DOCUMENTS

| | | | |
|---|---|---|---|
| 2,516,935 A | 8/1950 | Weaver et al. | |
| 4,484,029 A | 11/1984 | Kenney | |
| 5,485,517 A | 1/1996 | Gray | |
| 5,504,812 A | 4/1996 | Vangarde | |
| 5,649,309 A | 7/1997 | Wilcox et al. | |
| 5,850,612 A | 12/1998 | Kulberg et al. | |
| 5,966,776 A | 10/1999 | Ona | |
| 6,016,347 A | 1/2000 | Magnasco et al. | |
| 6,230,028 B1 | 5/2001 | Shirakawa | |

FOREIGN PATENT DOCUMENTS

| | | |
|---|---|---|
| DE | 3323858 A1 | 7/1983 |
| GB | 2 315 709 B | 8/2000 |
| GB | 2 351 201 A | 12/2000 |
| JP | 60-21636 A | 2/1985 |
| WO | WO 01/15331 A1 | 3/2001 |
| WO | WO 02/33205 A1 | 4/2002 |
| WO | WO 02/082783 A2 | 10/2002 |

*Primary Examiner*—Benny Quoc Tieu
(74) *Attorney, Agent, or Firm*—Lawrence J. Chapa

(57) ABSTRACT

The present invention provides a mechanism and method for rotating at least a first and second housing elements (120, 220) of a device (100) with respect to one another. The first and second housing elements (120, 220) have a common axis of rotation (270), which is substantially perpendicular to a front surface of the device (100). The mechanism includes a first transport (302), a second transport (304), a tension device (306), and an engagement member (400). The first and second transports (302, 304) selectively engage contact elements (308, 310) of the first and second housing elements (120, 220) and selectively travel about a ring path as the first and second housings rotate relative to one another. The tension device (306) has a first end (316) coupled to the first transport (302) and a second end (318) coupled to the second transport (304) at a point which travels around the axis of rotation (270) along a path, where the path extends at least partly around the axis of rotation (270) at a distance from the axis of rotation (270). The tension device (306) biases the rotational relationship of the first (120) and second (220) housing elements toward an opened position. The engagement member (400) is engaged with one of the first and second housing elements (120, 220) and is releasably engaged with the other one of the first and second housing elements (120, 220). The mechanism maintains the first and second housing elements (120, 220) in a closed position, when the engagement member (400) is engaged with the other one of the first and second housing elements (120, 220).

25 Claims, 14 Drawing Sheets

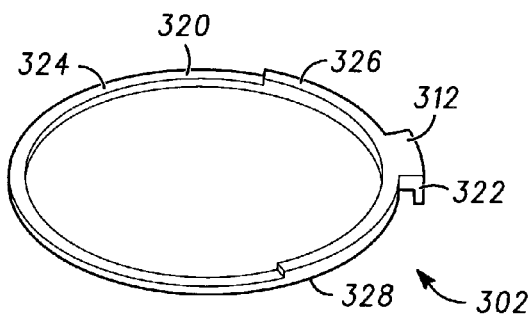
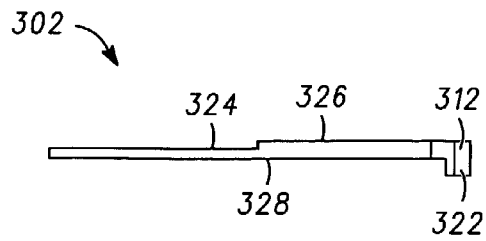
*FIG. 5*  *FIG. 6*
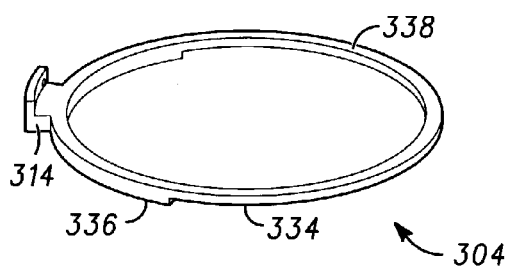
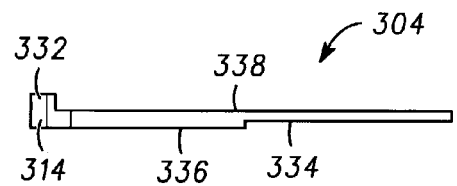
*FIG. 7*  *FIG. 8*
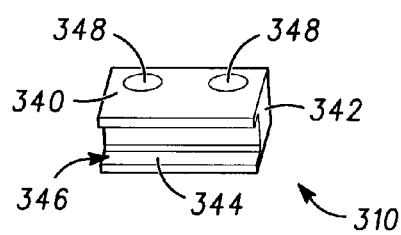
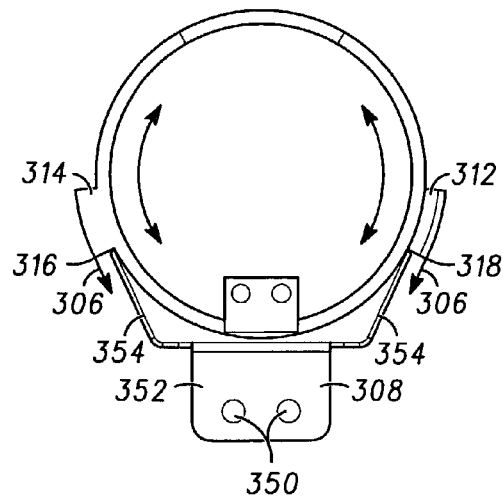
*FIG. 9*  *FIG. 10*

SELF OPERATING OPENING MECHANISM FOR USE IN HAND-HELD ELECTRONIC DEVICE

FIELD OF THE INVENTION

The present invention relates generally to the field of portable electronic devices and, more particularly, to a hand-held electronic device having at least a two-part housing which rotates between an opened and a closed position to facilitate usage.

BACKGROUND OF THE INVENTION

Portable electronic devices have many functions and come in a variety of different form factors. For purposes of convenience there is a general trend toward miniaturization of many types of portable electronic devices. Miniaturization generally makes it easier to carry the electronic device on one's self, including fitting the device into one's pocket/purse or attaching the device to one's belt.

While generally there is a motivation to shrink a device's form factor as much as possible, in several specific instances the extent to which the size of a device can be reduced is limited by other countervailing motivations. In some instances, the extent to which the size of a device can be reduced is limited by minimum size requirements that may be necessary for a person to conveniently use and/or interact with the device. For example, a keypad can only shrink so far before it becomes difficult to operate. A keypad generally needs to accommodate the size of the user's hands and/or fingers. Similarly, telephone handsets, which accommodate two-way communication, generally need to accommodate a microphone proximate a user's mouth and a speaker proximate a user's ear.

In order to meet these types of requirements, while otherwise attempting to minimize the devices overall size, many manufacturers have introduced devices having two part housings, which fold with respect to one another, thereby allowing the device to fold open when being used and to fold close when not being used. This allows a device, like a phone, to be more conveniently stored when not being used, and allows the device to expand to a convenient size commensurate with the usage needs.

Previous wireless communication devices have incorporated two part housings, which fold open when being used and fold close when not being used. One such design includes a flip-type or clam shell design, which generally includes two housing portions coupled together by a hinge at one end of the device. The two parts of the housing rotate with respect to one another along an axis of rotation, which is parallel to the front surface of the device or front facing.

Further, previous wireless communication devices have incorporated a two part housing, which includes two housing portions that rotate with respect to one another around an axis of rotation, which is perpendicular to the front surface of the device. In at least one design, the housing portions can rotate to an opened position in either a clockwise direction or a counter-clockwise direction. One such device is disclosed in U.S. application Ser. No. 09/826,180, entitled "Rotational Mechanism for a Wireless Communication Device", filed Apr. 4, 2001, the disclosure of which is incorporated herein by reference.

A large number of these devices being portable in nature are of the type to be used by people away from home or work. In many instances, these individuals will attempt to use the device while performing other activities, where one or both of their hands are generally full or are otherwise engaged. In absence of a self-operating mechanism which accommodates the opening of the two part housing, or in other words, the rotation of the two housing portions with respect to one another, the device generally needs to be opened by separately gripping each housing portion and repositioning/rotating the housing portions, relative to one another. This generally requires that the user free up both hands for opening the device.

For at least flip-type device designs, previous automated opening mechanisms have been developed, which reduce the effort required for opening the device. In some instances the automated opening mechanism enables the device to be opened using a single hand. Many of these devices incorporate a spring loaded mechanism held closed by a latch. By releasing the latch, the spring action causes the two portions of the housing to rotate with respect to one another into an opened position. Generally one or more physical stops are additionally incorporated to limit the rotational movement of the two parts relative to one another at one or both of the opened and closed positions. However, the same geometries present in an automated opening mechanism for a flip-type device do not directly translate to an electronic device having a two part housing, where the two housing parts rotate with respect to one another along an axis of rotation that is substantially perpendicular to the front facing of the device. Still further, it would be beneficial to develop an automated opening mechanism, that would facilitate opening the housing elements in each of either a clockwise or a counter-clockwise direction, in order to facilitate either left-handed or right-handed operation.

Consequently, there is a need for a self operating opening mechanism for use in a hand-held portable electronic device, including devices incorporating a two-part housing, where the two parts rotate with respect to one another along an axis of rotation that is substantially perpendicular to the front facing of the device. In addition, the desired mechanism should not compromise the stability and rigidity of the device in the opened and closed positions. It would be further beneficial if the mechanism could be conveniently operated with a single hand using either the right or the left hand, and still further beneficial if the mechanism could facilitate rotation of the two parts relative to one another in each of a clockwise and a counter-clockwise direction.

SUMMARY OF THE INVENTION

The present invention provides a mechanism for rotating at least a first and a second housing element of a device with respect to one another, where the first and second housing elements have a common axis of rotation, which is substantially perpendicular to a front surface of the device. The first housing element having a ring path, which extends at least partly around the axis of rotation at a distance away from the axis of rotation. The mechanism includes a first transport, a second transport, a tension device, and an engagement member.

The first transport and the second transport are each located on and separately travel about the ring path. Each transport has a corresponding contact point and connection point. The tension device is coupled to each of the first and second transports, having a first end coupled to the connection point of the first transport, and a second end coupled to the connection point of the second transport.

A first contact element is fixed relative to the first housing element and a second contact element is fixed relative to the second housing element. The contact points of the first and second transports are located on opposite sides of first and second contact elements of the first and second housing elements along the ring path, and selectively engage alternative ones of the contact points of the first and second transports, thereby limiting the rotation of the transports relative to the first and second housing elements in the direction that the contact elements of the first and second housing elements engage the contact points.

The engagement member is engaged to one of the first and second housing elements and is releasably engaged with the other one of the first and second housing elements, which limits relative rotational movement of the first and second housing elements, relative to one another, when the first and second housing elements are at or near a rotatably closed position.

In at least one embodiment, a portion of the tension device extends along a tension device path, which diverges from the ring path and extends along at least a part of the length of the first housing element along a first leg of the path and back toward the ring path along a second leg of the path.

In at least a further embodiment, the second housing element can be rotated relative to the first housing position from a rotatably opened to a rotatably closed position in either a clockwise or a counter-clockwise direction.

The present invention further provides a method for opening a first and a second housing element of a hand-held device using a self-opening mechanism, where the first and a second housing element of a hand-held device have an axis of rotation, which is substantially perpendicular to a front surface of the device.

The method includes preloading a tension device having a first end coupled to a first transport and a second end coupled to a second transport, where the first and second transports are located on and separately travel about a ring path which extends at least partly around a common axis of rotation at a distance away from the common axis of rotation. The tension device is preloaded by rotating the first housing element and the second housing element with respect to one another toward a closed position. As the first and second housing elements are rotated toward a closed position, at least one of the first and second transports are correspondingly engaged, causing the same to travel about the ring path.

The rotational movement of the first and second housing elements is limited, when the first and second housing elements are at or near a rotatably closed position, by applying a holding force applied by an engagement member.

The first and second housing elements are then released, thereby enabling the relative rotation of the first and second housing elements toward an equalized open position as a result of the force exerted by the preloaded tension device upon the at least one of the first and second transports, which is selectively engaged with the respective housing element.

In at least one of the embodiments, releasing the first and second housing elements includes applying a release force to the engagement member, which biases the engagement member in a direction that reduces the holding force below a level where the force applied by the preloaded tension device can overcome the holding force.

In a further embodiment, releasing the first and second housing elements includes applying an opening force to at least one of the first and second housing elements, in the direction of rotation, which in addition to the force applied by the preloaded tension device overcomes the holding force applied by the engagement member.

These and other object, features, and advantages of this invention are evident from the following description of one or more preferred embodiments of this invention, with reference to the accompanying drawings.

BRIEF DESCRIPTION OF THE DRAWINGS

FIG. 5 is a perspective view of a first transport, which travels about a ring path, which extends at least partly around a common axis of rotation;

FIG. 6 is a side view of the first transport illustrated in FIG. 5;

FIG. 7 is a perspective view of a second transport, which similar to the first transport illustrated in FIGS. 5 and 6, travels about the ring path;

FIG. 8 is a side view of the second transport illustrated in FIG. 7;

FIG. 9 is a perspective view of a contact element fixed relative to the lower housing;

FIG. 10 is a partial plan view illustrating the interaction between the first and second contact elements and the first and second transports, in accordance with at least one embodiment;

DETAILED DESCRIPTION OF THE PREFERRED EMBODIMENT(S)

Figure 1:
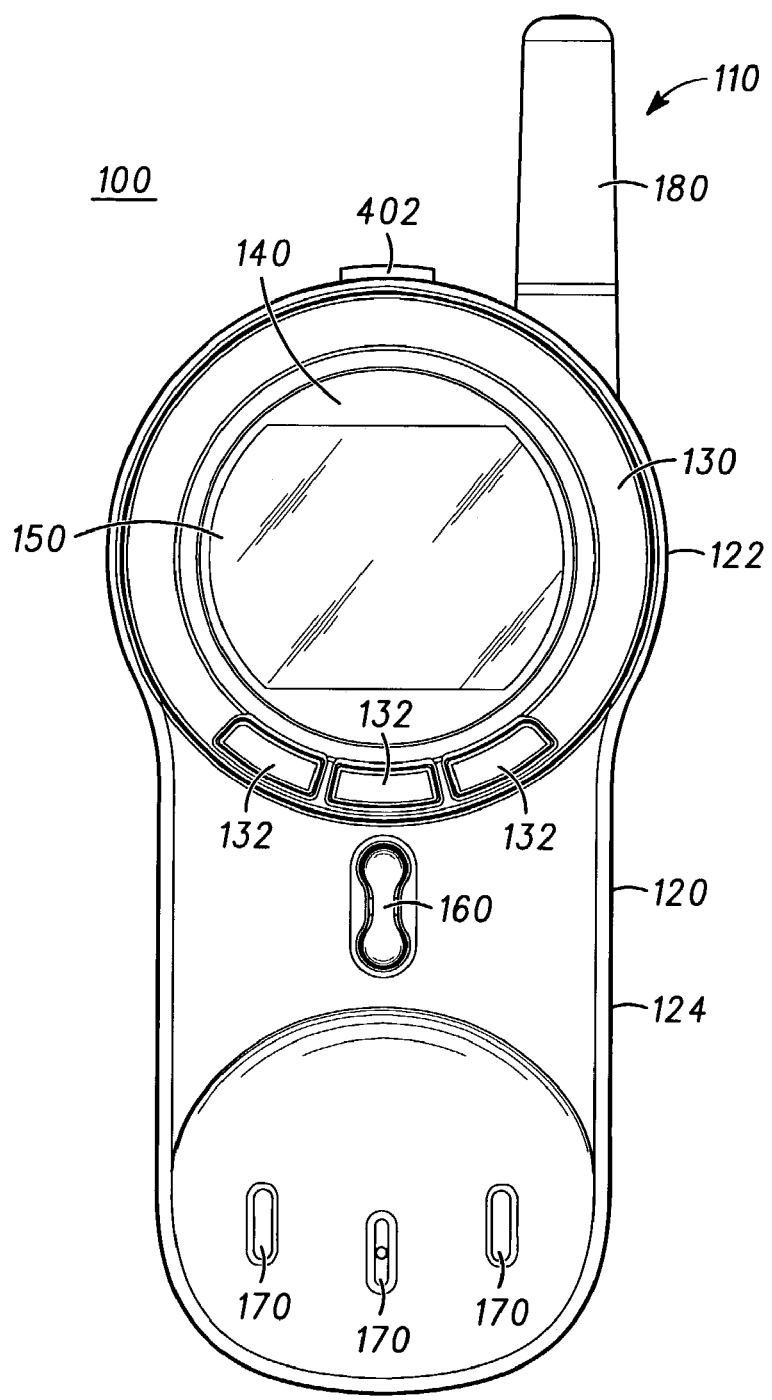
FIG. 1 is a front plan view of a radiotelephone in a closed position.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Referring to FIG. 1, there is provided a collapsible radiotelephone 100 in a closed position 110. The radiotelephone 100 has wireless communication capabilities and, thus, may be used to communicate with wireless infrastructure, such as cellular base stations, regional and local wireless transponders, and wireless local area networks. The radiotelephone 100 described herein is a representation of the type of wireless communication device that may benefit from the present invention. However, it is to be understood that the present invention may be applied to any type of hand-held or portable electronic device including, but not limited to, the following devices: radiotelephones, cordless phones, paging devices, personal digital assistants, portable computers, pen-based or keyboard-based handheld devices, remote control units, an audio player (such as an MP3 player) and the like. Accordingly, any reference herein to the radiotelephone 100 should also be considered to apply equally to other hand-held or portable electronic devices.

For the preferred embodiment shown in FIG. 1, the radiotelephone 100 has at least two housing elements including an upper housing 120 having a generally elongated and planar shape. The upper housing 120 has an upper circular portion 122 at one end and an upper extending portion 124 extending away from the upper circular portion. In the closed position 110, as illustrated, the upper circular portion 122 and the upper extending portion 124 are rotated so as to be adjacent to similar matching elements corresponding to a lower housing, which are more clearly illustrated in FIG. 2. The radiotelephone 100 further includes an external antenna 180, which may be provided to enhance the wireless communication capabilities of the radiotelephone 100.

Components of the radiotelephone 100 are positioned near the upper circular portion 122 including an interchangeable cover 130, a locking piece 140, and a display 150. The interchangeable cover 130 has a ring-like shape that may be attached to, and detached from, the radiotelephone 100. The interchangeable cover 130 may include cover selection buttons 132 and/or indicator lights (not shown) to provide additional functionality to the radiotelephone 100. For example, the preferred embodiment provides three cover selection keys 132: a left selection key, and right selection key and a menu key therebetween. The display 150 may be any type of output device that provides a convenient display of text and/or graphics to the user. Preferably, the display 150 is a liquid crystal display having a backlighting system to illuminate the display when lighting conditions are insufficient for proper viewing by the user. The locking piece 140 locks certain components of the radiotelephone 100 together, while simultaneously allowing relative rotational movement of the upper housing with respect to the lower housing. The locking piece 140 can also function as a display lens to protect the display 150 from undesirable, foreign matter.

The extended portion 124 of the upper housing 120 may include upper housing selection buttons 160 and speaker apertures 170. Although many different selection buttons may be provided on the upper housing 120, only one upper housing selection button 160 is shown in FIG. 1 by way of example. In this particular embodiment the selection button is similar to a rocker button having a two-direction "scrolling" function. The upper housing 120 of the present invention may include one or more selection buttons (such as selection buttons 132 and 160) for various types of features including, but not limited to, volume control, menu control, call answering, call termination, caller identification, phone book control, voicemail control, e-mail/messaging control, network browsing, power on/off, and the like. The speaker apertures 170 direct sounds generated by a speaker or other type of audio output device to the user.

In the illustrated embodiment, the upper housing 120 principally functions as a cover, which as noted above can also include some functional electronic components, such as selection buttons 132 and 160, a speaker, or indicator lights. However, in the illustrated embodiment, a majority of the functional electronic components are included as part of the lower housing, which is also referred to as the body.

Figure 2:
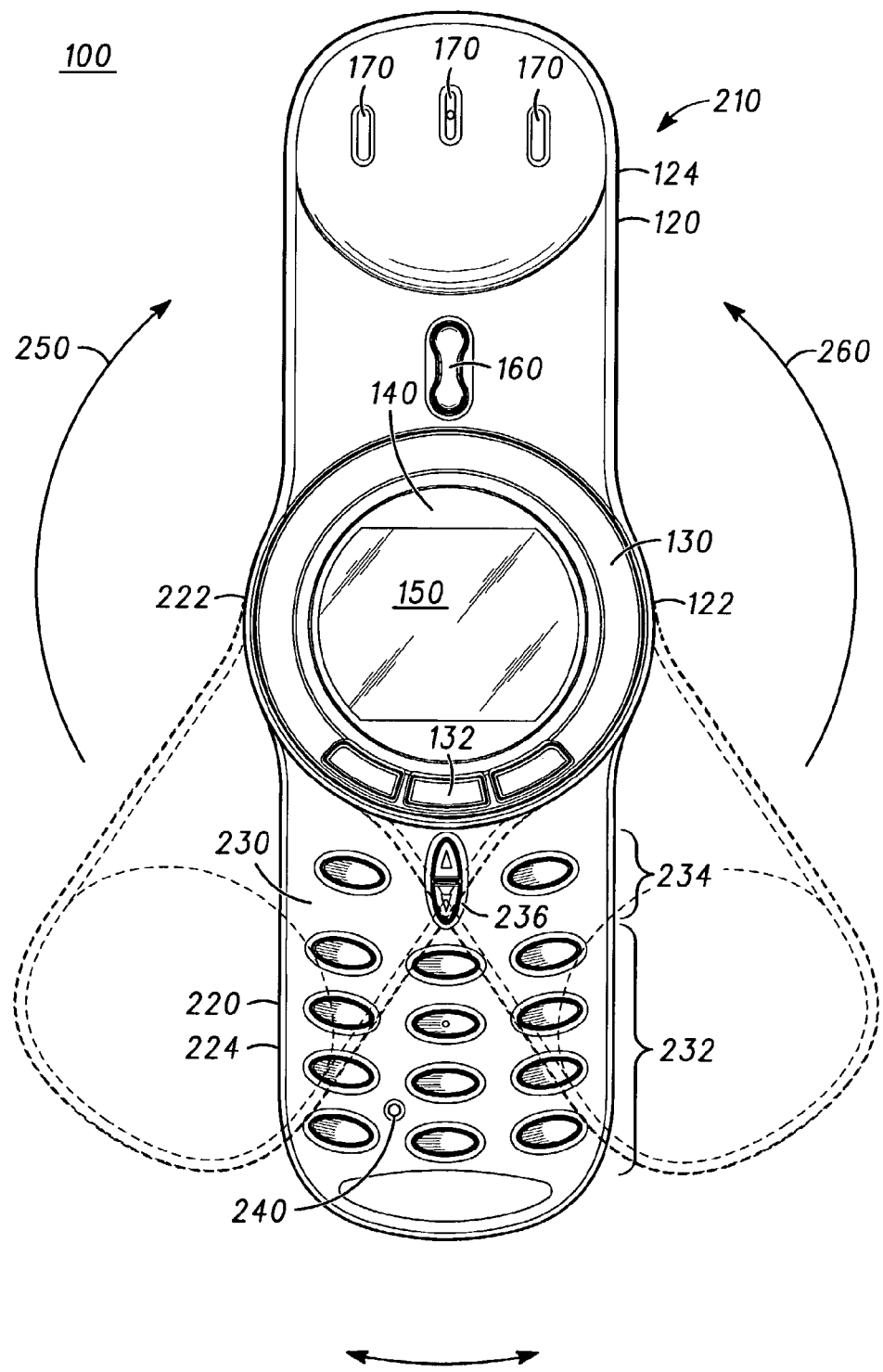
FIG. 2 is a front plan view of the radiotelephone of FIG. 1 in an opened position, as well as two alternative intermediate positions.

Referring to FIG. 2, the preferred embodiment of the radiotelephone 100 is shown in an opened position 210. The portions of the radiotelephone 100 that become visible in the opened position 210 include a lower housing 220, a keypad 230 and a microphone aperture 240. When viewed from the front, the lower housing of the preferred embodiment has a substantially similar profile to the upper housing 120. Correspondingly, the lower housing includes a lower circular portion 222 and a lower extending portion 224. In the opened position 210, the upper circular portion 122 of the upper housing 120 is adjacent to, and positioned above, the lower circular portion of the lower housing 220. On the other hand, the upper extending portion 124 is positioned away from the lower housing. For example, as shown in FIG. 2, the upper extending portion 124 is oriented in an opposite direction to the lower extending portion 224 on opposite sides of the upper and lower circular portions 122 and 222. The keypad 230 may include any layout of keys that provide convenient operation of the radiotelephone 100 by the user. The microphone aperture 240 directs sounds received from the user or other local sounds to a microphone or other type of audio input device.

The preferred embodiment includes a standard layout of alphanumeric and menu control for operation of the radiotelephone 100. As shown in FIG. 2, the keypad 230 includes twelve standard keys 232 (namely, 0 through 9, # and *) as well as three lower housing selection buttons 234. However, the radiotelephone 100 may include a larger grouping of keys, such as a QWERTY keyboard, if a device having a larger form factor or smaller individual keys is desired. Although not shown in FIG. 2, the keypad 230 may also include a cursor or graphical pointing device such as a joystick, touch pad or track ball. Also, similar to selection buttons 132 and 160 described, above, the lower housing selection buttons 234 may be used for various features including, but not limited to, volume control, menu control, call answering, call termination, caller identification, phone book control, voicemail control, e-mail/messaging control, network browsing, power on/off, and the like.

The preferred embodiment shown in FIGS. 1 and 2 includes at least two functional positions, namely an opened position 210 (FIG. 2), and a closed position 110 (FIG. 1). Generally, the opened position 210 and the closed position 110 activate functions of the radiotelephone 100 such as answering an incoming call and/or initiating a new call, or terminating an existing call. Other relative rotational positions may define alternative functions, and in some cases may select or define functions not specific to radiotelephones. The relative rotational position of the housing may also affect the functionality of, the cover selection buttons 132, upper housing selection button 160, and lower housing selection buttons 234. For example, the selection buttons 132, 160, 234 and 236 may each activate a different function dependent upon the position of the upper housing 120 relative to the lower housing 220.

FIG. 2 additionally illustrates at least two intermediate relative rotational positions, using dashed lines. A first intermediate position illustrates the upper housing 120 rotating in a clockwise direction 250 relative to the lower housing 220, and the second intermediate position illustrates the upper housing 120 rotating in a counter-clockwise direction 260 relative to the lower housing 220, from a closed position toward an opened position.

Figure 3:
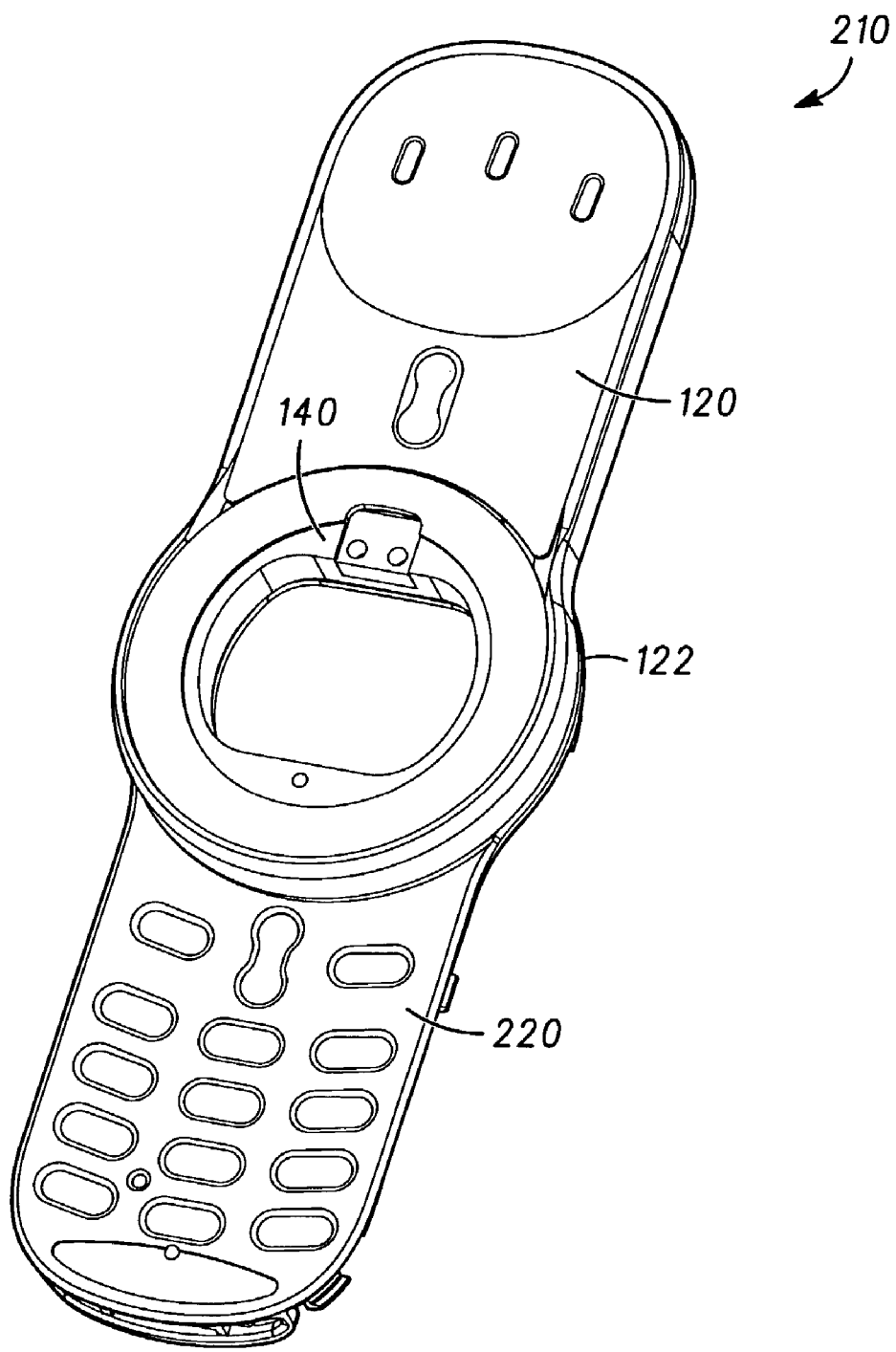
FIG. 3 is a perspective view of the upper and lower housings in a rotatably opened position.

FIG. 3 illustrates a perspective view of the upper housing 120 and lower housing 220 in a rotatably opened position. A locking piece 140 is shown, which in the illustrated embodiment is locked relative to the lower housing 220, while simultaneously allowing relative rotational movement of the upper housing 120 with respect to the lower housing 220.

Figure 4:
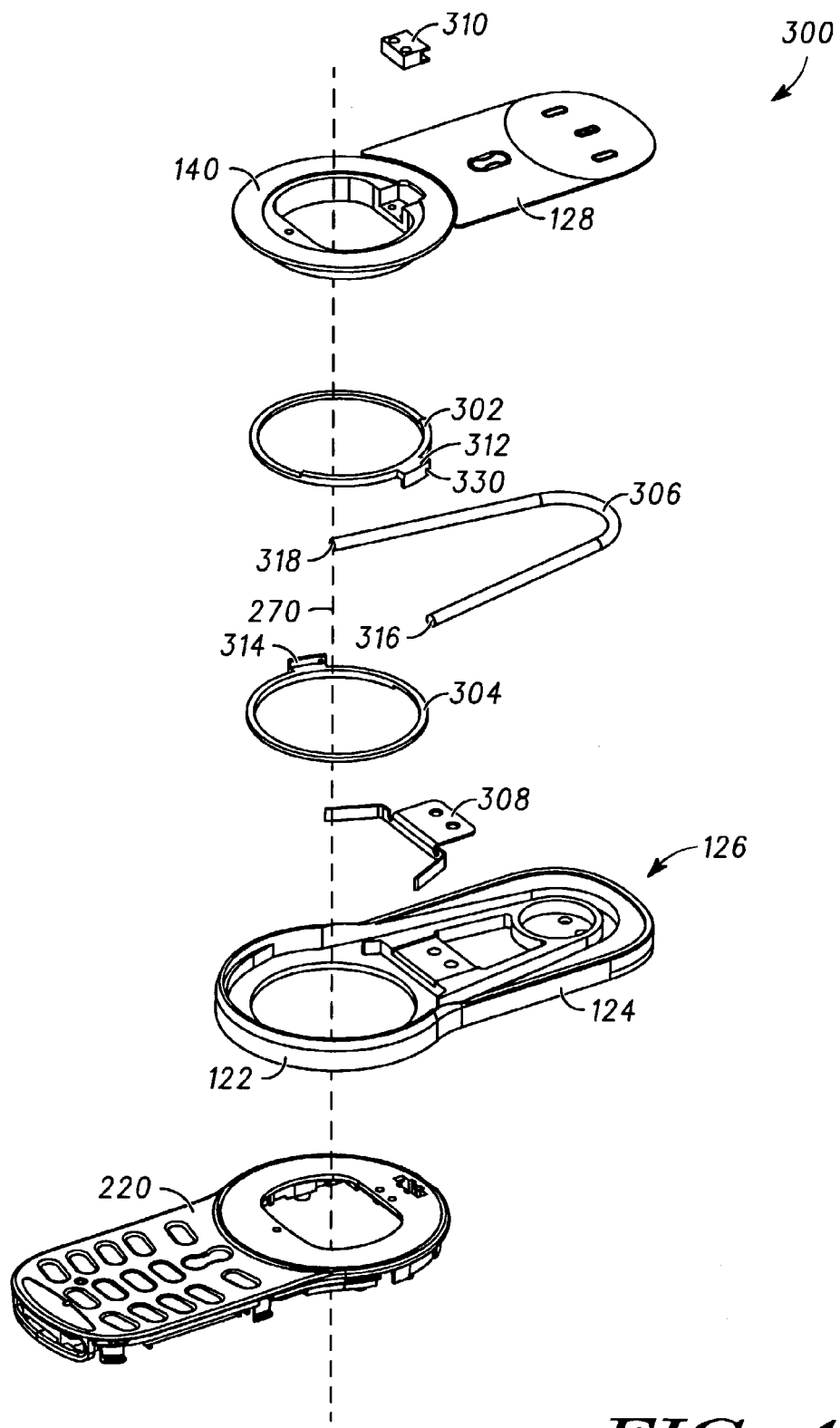
FIG. 4 is an exploded perspective of the upper and lower housings including a rotation mechanism in accordance with at least one embodiment of the radiotelephone illustrated in FIGS. 1–3 viewed from the front facing.

In order to facilitate movement between an opened position 210 and a closed position 110, where the upper housing 120 and the lower housing 220 have a common axis of rotation 270, that is substantially perpendicular to the front surface of the radiotelephone device, the radiotelephone 100 includes a self operating opening mechanism 300 for rotating the upper housing 120 relative to the lower housing 220. FIG. 4 illustrates an exploded, perspective view of the upper 120 and lower 220 housings, and at least a portion of an opening mechanism 300 in accordance with at least one embodiment of the radiotelephone 100 of FIGS. 1–3, viewed from a direction consistent with the front side facing of the radiotelephone 100.

The opening mechanism 300 includes a first transport 302, a second transport 304, a tension device 306, a first contact element 308 and a second contact element 310. In the illustrated embodiment, the upper housing 120 has a base upper housing portion 126, which includes the upper circular portion 122 and a base portion of the upper extending portion 124 of the upper housing 120, and a top cover 128, which extends to cover the upper extending portion 124 of the upper housing 120.

In the illustrated embodiment, the top cover 128 operates to retain several elements of the opening mechanism within the upper housing 120. However, while the illustrated embodiment provides for several of the elements of the opening mechanism 300 to be retained within the upper housing 120, one skilled in the art can readily appreciate that the location of all or some of the elements of the opening mechanism 300, could be alternatively located, with at least some of the elements being alternatively located within the lower housing 220.

In the illustrated embodiment, the first transport 302 and the second transport 304 are substantially ring-shaped. The substantially ring-shaped transports 302, 304 travel around a ring path, which extends at least partly around said axis of rotation 270 at a distance away from the axis of rotation, corresponding to the radius of the ring-shaped transports 302, 304. In the illustrated embodiment, the first transport travels on top of the second transports. Each ring transport has a respective side protrusion 312, 314, which is more clearly illustrated in FIGS. 5–8. The protrusion 312 of the first transport 302 is coupled to a first end 316 of the tension device 306, and the protrusion 314 of the second transport 304 is coupled to a second end 318 of the tension device 306.

The first contact element 308 is coupled to the upper housing 120, so as to be generally fixed relative thereto. More specifically, the first contact element 308 is coupled to the base 126 of the upper housing 120. The second contact element 310 is coupled to the lower housing 220, so as to be generally fixed relative thereto. More specifically, the second contact element 310 is coupled to the locking piece, which is fixed, including rotationally fixed, relative to the lower housing 220. Each of the first and second contact elements 308, 310, selectively engage the first and second transports 302, 304, as the first and second housing elements rotate with respect to one another, and the corresponding contact elements similarly rotate about the ring path.

While in the illustrated embodiment, the first and second contact elements 308, 310, are shown as separate elements coupled to each of their respective housing element 120, 220, one skilled in the art will readily appreciate that the contact element could be integrally formed as part of the corresponding upper housing 120 and lower housing 220.

FIGS. 5 and 6 illustrate an enlarged perspective view and a side plan view of a first transport 302, that travels about a ring path, which extends at least partly around a common axis of rotation 270. As noted above, in the illustrated embodiment, the first transport is substantially ring-shaped, and includes a side protrusion 312. At the the edge of the protrusion 312, which is furthest away from the ring body 320, the protrusion 312 has a lip 322 which extends downward. In the illustrated embodiment, the side walls of the protrusion 312 form an acute angle with the ring body 320. The tension device couples to the lip 322 of the protrusion 312 via a hole 330 located through the lip 322.

The surface 324 of the ring, which faces in an upward direction, or in other words a direction that is opposite to the direction that the protrusion lip extends, has a portion 326 that is raised relative to the rest of the upper surface 324. In the illustrated embodiment, the portion of the ring surface that is raised includes a portion of the ring that extends partly around the ring and includes the portion of the ring that couples to the protrusion 312. In the illustrated embodiment, the raised portion 326 of the upper surface 324 creates a stair step effect. In the illustrated embodiment the lower surface 328 of the ring body 320 is substantially level or planer.

FIGS. 7 and 8 illustrate an enlarged perspective view and a side plan view of a second transport 304, that travels about a ring path, which extends at least partly around a common axis of rotation 270. In the illustrated embodiment, the second transport is substantially similar to the first transport. More specifically, similar to the first transport, the second transport has a protrusion 314 with a lip 332. Additionally, the transport 304 has a surface 334, which includes a raised portion 336, and a surface 338, which is substantially level or planer.

While physically the first transport 302 and the second transport 304 are substantially similar, in operation the second transport 304 operates in an orientation that is flipped relative to the first transport 302. As a result, the substantially level or planer surface 338 of the second transport 304 faces upward, and the surface 334 having the raised stair step-like portion 336 faces downward. In this way, the first transport 302 and the second transport 304 rotate relative to one another along the substantially planer surfaces 328, 338 of each of the first and second transports 302, 304.

FIG. 9 illustrates a perspective view of the contact element 310, illustrated in FIG. 4, which is fixed relative to the lower housing 220. The contact element 310 has a top plate 340, a middle section 342, and a bottom plate 344. Both the top plate 340 and the bottom plate 344 over hang the middle section 342, thereby creating a gap 346 between the portions of the top plate 340 and the bottom plate 344, which over hang the middle section 342. Mounting holes 348 extend through each of the top plate, bottom plate and middle section 342, to facilitate coupling the contact element 310 to the lower housing 220. However, in instances where the contact element 310 is integrated with the lower housing 220, mounting holes may not be necessary.

As illustrated in FIG. 10, the contact element 310 is positioned relative to the ring path, so that the gap 346 encompasses a portion of the ring path, and correspondingly a portion of each of the first and second transports 302, 304, which travels along the ring path. The width of the gap 346 is sufficient to allow the portions of the transports 302, 304, that do not include the raised stair step-like portions 326, 336 of the transports 302, 304 to travel freely within the gap 346. When the gap 346 of the contact portion 310 approaches and attempts to coincide with the raised portion 326, 336 of either of the transports 302, 304, the corresponding over hang 340, 344 engages the vertical edge facing of the surface 324, 334 of the ring-shaped transport having the raised portion 326, 336. The top plate 340 of the contact element 310 engages and restricts relative movement of the first transport 302, and the bottom plate 344 of the contact element 310 engages and restricts relative movement of the second transport 304.

FIG. 10 additionally illustrates a contact element 308, adapted to be coupled to the upper housing. The contact element 308 of the upper housing 120, similar to the contact element 310 of the lower housing 220, has mounting holes 350, which extend through a main body 352 and facilitate the coupling of the contact element 308 to the upper housing 120. The contact element 308 additionally includes a pair of arms 354 extending from the main body 352. Similar to the top and bottom plates 340, 344 of the contact element 310 of the lower housing 220, the pair of arms 354 of the contact element 308 of the upper housing selectively engage the ring-shaped transports 302, 304. In the illustrated embodiment, the arms 354 engage the transports 302, 304, proximate the point where the protrusions 312, 314 extend from the ring-shaped transports 302, 304.

Tension device 306, which is coupled to each of the transports 302, 304, via the protrusions 312, 314, biases each of the transports toward a position where the upper housing 120 and the lower housing 220 are rotationally oriented, relative to one another, in an open position. The relative locations of the various elements of the opening mechanism 300, when the upper and lower housings 120, 220 are rotationally in a substantially opened position, are illustrated in FIG. 10.

As the upper housing 120 and the lower housing 220 rotate away from a substantially opened position toward a substantially closed position, the contact element 308 of the upper housing 120 will engage one of the ring-shaped transports 302, 304, causing the same to rotate with the upper housing. Correspondingly, the contact element 310 of the lower housing 220 will engage the other one of the ring-shaped transports 302, 304, causing the same to rotate with the lower housing. The respective endpoints of the tension devices with similarly travel around the ring path with the transports 302, 304, as the protrusions of the ring-shaped transports travel about the ring path. This will, in effect, result in the path distance of the tension device 306 changing to include more or less of the ring path.

Generally, as the relative rotation of the upper and lower housings 120, 220 move closer to an opened position, the path distance of the tension device 306 decreases. As the relative rotation of the upper and lower housings 120, 220 move closer to a closed position, the path distance of the tension device 306 increases. Dependent upon which direction the upper and lower housings 120, 220 rotate relative to one another the contact elements 308, 310 of the upper and lower housings 120, 220 will engage alternative ones of the ring-shaped transports 302, 304. If the upper and lower housings 120, 220, which are rotating from an opened position to a closed position, continue to be rotated beyond the closed position in the same direction, that the housings moved to reach the closed position, eventually the protrusions 312, 314 of each of the upper and lower housings 120, 220 will come into contact with one another thereby limit further relative rotation in that direction. This will provide a limit of the maximum distance that the path of the tension device will travel.

Figure 11A:
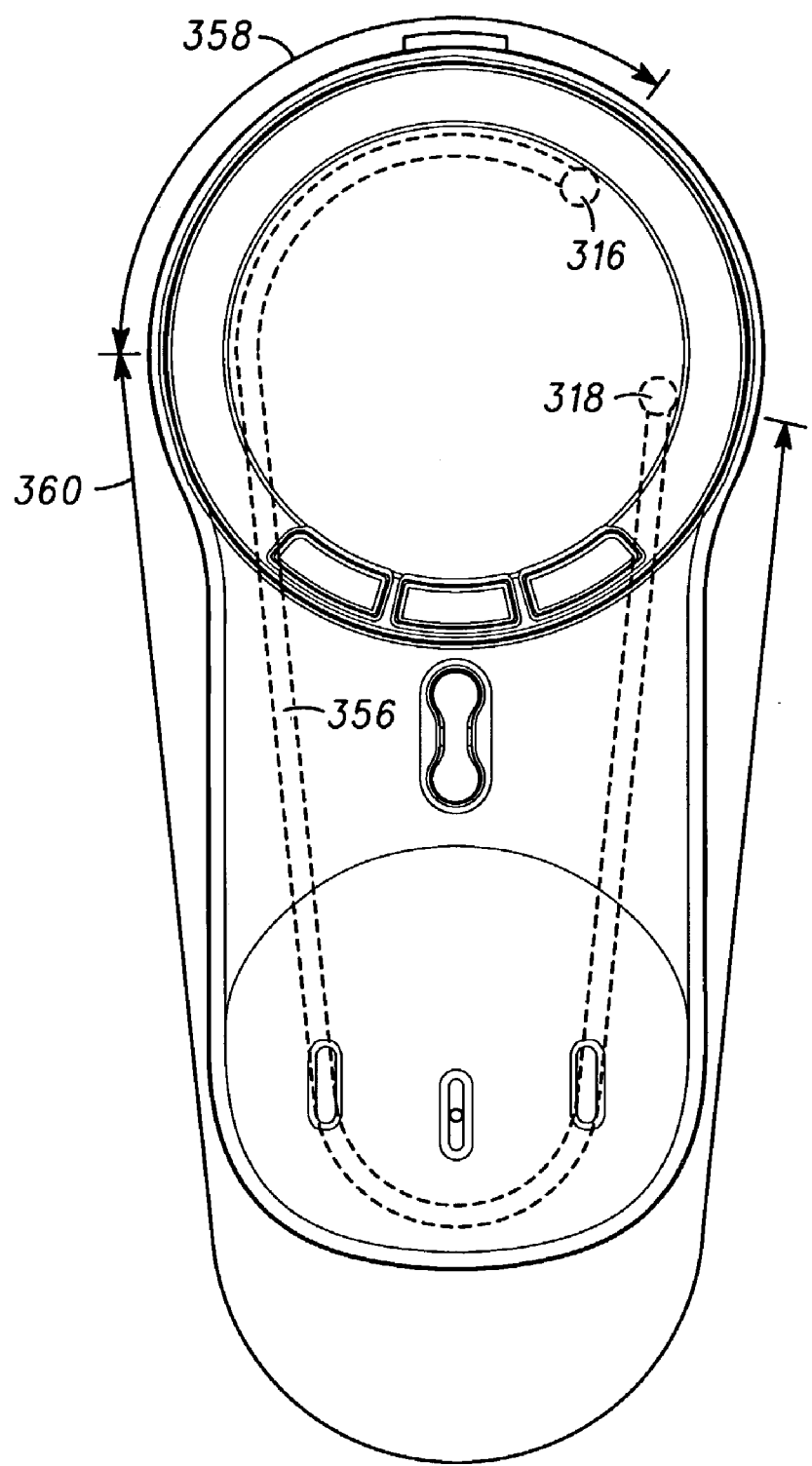
FIGS. 11A–11C are plan views of the radiotelephone of FIGS. 1 and 2 having two housing elements, that move between an opened and a closed position, with the position of a tension device and corresponding end points and travel path of the tension device highlighted.
Figure 11B:
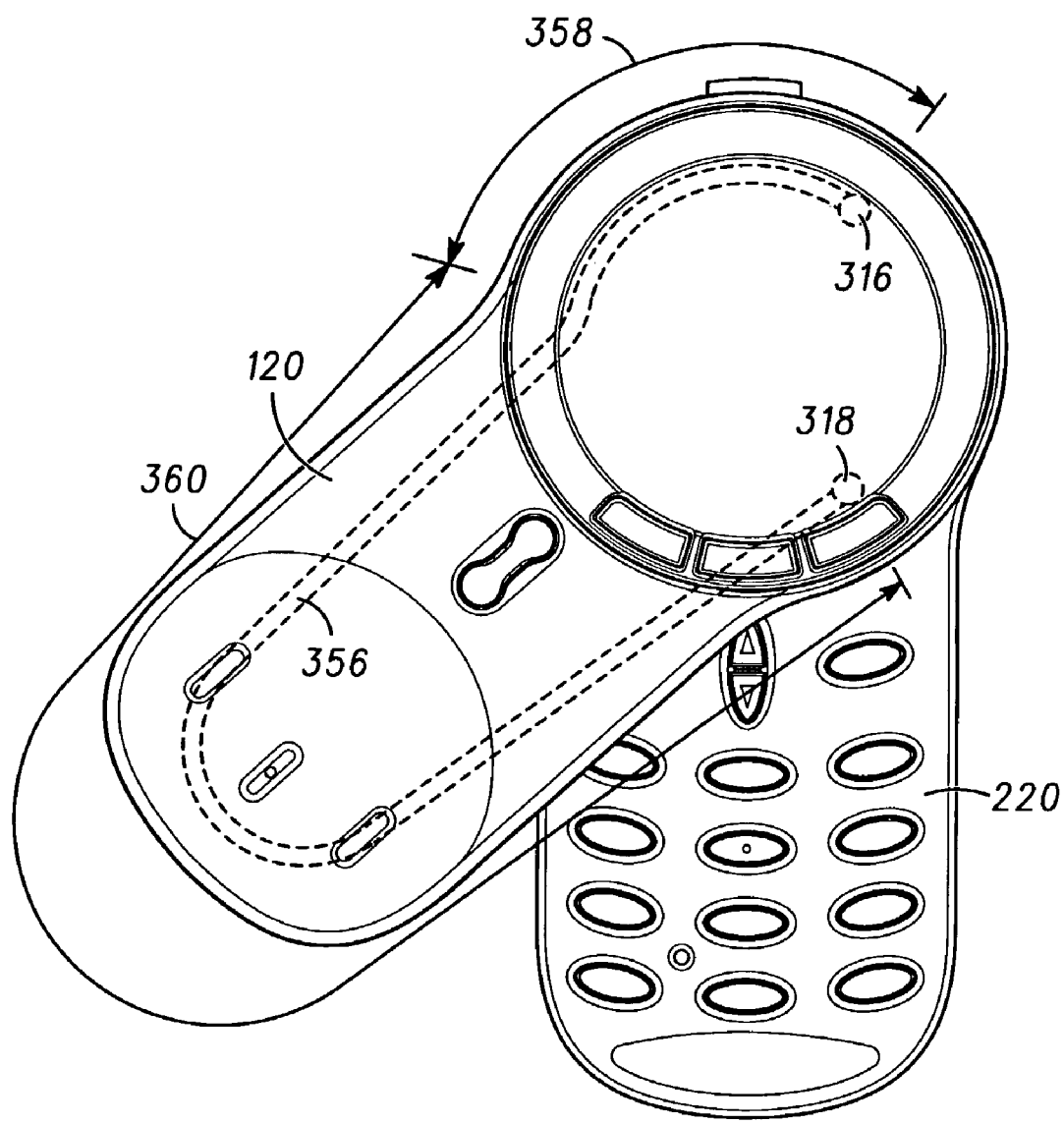
Figure 11C:
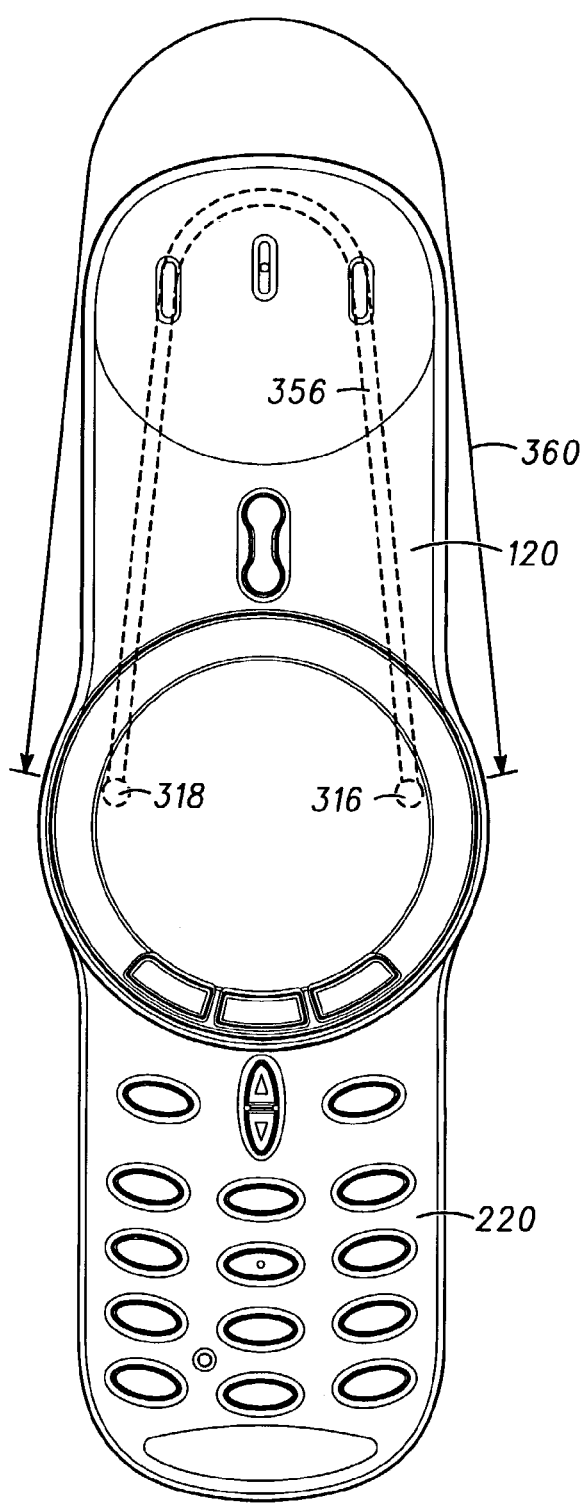

FIGS. 11A–11C illustrate sequential plan views of portions of the radiotelephone illustrated in FIGS. 1 through 10 having an upper and lower housing, that move between an opened and a closed position, with the position of a tension device 306 including corresponding end points 316, 318 and a travel path 356 of the tension device 306 highlighted.

More specifically, FIG. 11A illustrates the upper housing 120 and the lower housing 220 in a rotatably closed position. FIG. 11C illustrates the upper housing 120 and the lower housing 220 in a rotatably opened position. FIG. 11B illustrates the upper housing and the lower housing 220 between a rotatably opened position and a rotatably closed position.

Highlighted in each of FIGS. 11A–11C is a representation of the position of the end points 316, 318, and the corresponding travel path 356, of a tension device 306, relative to the upper and lower housing 120, 220, as the upper and lower housing 120, 220 rotate with respect to each other. As noted above, each end 316, 318 of the tension device 306 is coupled to one of the ring-shaped transports 302, 304, which are selectively engaged by the contact elements 308, 310 of the upper and lower housings 120, 220.

In the direction of travel illustrated in FIGS. 11A–11C, end point 316 rotates with the lower housing 220, and end point 318 rotates with the upper housing 120. If the upper and lower housings 120, 220 are rotated from an opened position toward a closed position in a counter-clockwise direction, then when the upper and lower housings 120, 220 are released, the upper and lower housings 120, 220 retrace their rotational path back toward an opened position in a clockwise direction.

By using a pair of transports 302, 304 as part of the opening mechanism, as illustrated in the present invention, the upper and lower housings 120, 220 can be closed in either a clockwise or a counter-clockwise direction. This has the effect of preloading the tension device. However, as noted above, this will then dictate the direction in which the upper and lower housings 120, 220 will rotate back to an opened position.

In at least one embodiment, the tension device 306 is a spring which extends between the two end points 316 and 318, along a path having a first portion 358, which extends at least partly around an axis of rotation, and a second portion 360, which extends along the length of the upper housing 120. In alternative embodiments, the second portion of the path could alternatively extend along a portion of the length of the lower housing 220, this can be the case, where the position of the elements of the rotation mechanism 300 are located in alternative ones of the upper and lower housings 120, 220.

In at least one embodiment, the portion of the path extending along the length of the upper housing 120 has a length, that is longer than the unstretched length of the tension device 306. This results in the tension device 306 exerting a force, which biases the upper and lower housing toward an opened position, in a direction which minimizes the path distance including the path distance associated with the portion of the path 358 that extends at least partly around the axis of rotation 270, regardless of the amount of the path length that is associated with portion of the path 358 that extends at least partly around the axis of rotation 270. In the illustrated embodiment, the portion of the path 358 that extends at least partly around the axis of rotation is minimized when the upper and lower housings are in a rotatably opened position relative to one another, as shown in FIG. 11C.

In the illustrated embodiment, the upper housing 120 and lower housing 220 are rotated back to a closed position by manually applying an external closing force, which is greater than the tension force of the tension device 306. When the upper housing 120 and lower housing 220 are at or near a closed position, a latch 400 or engagement mechanism, illustrated in FIGS. 13–15, maintains the relative rotation of the upper housing 120 and lower housing 220 in a closed position until the latch is released and the upper and lower housings 120, 220 move back toward an opened position.

Figure 12A:
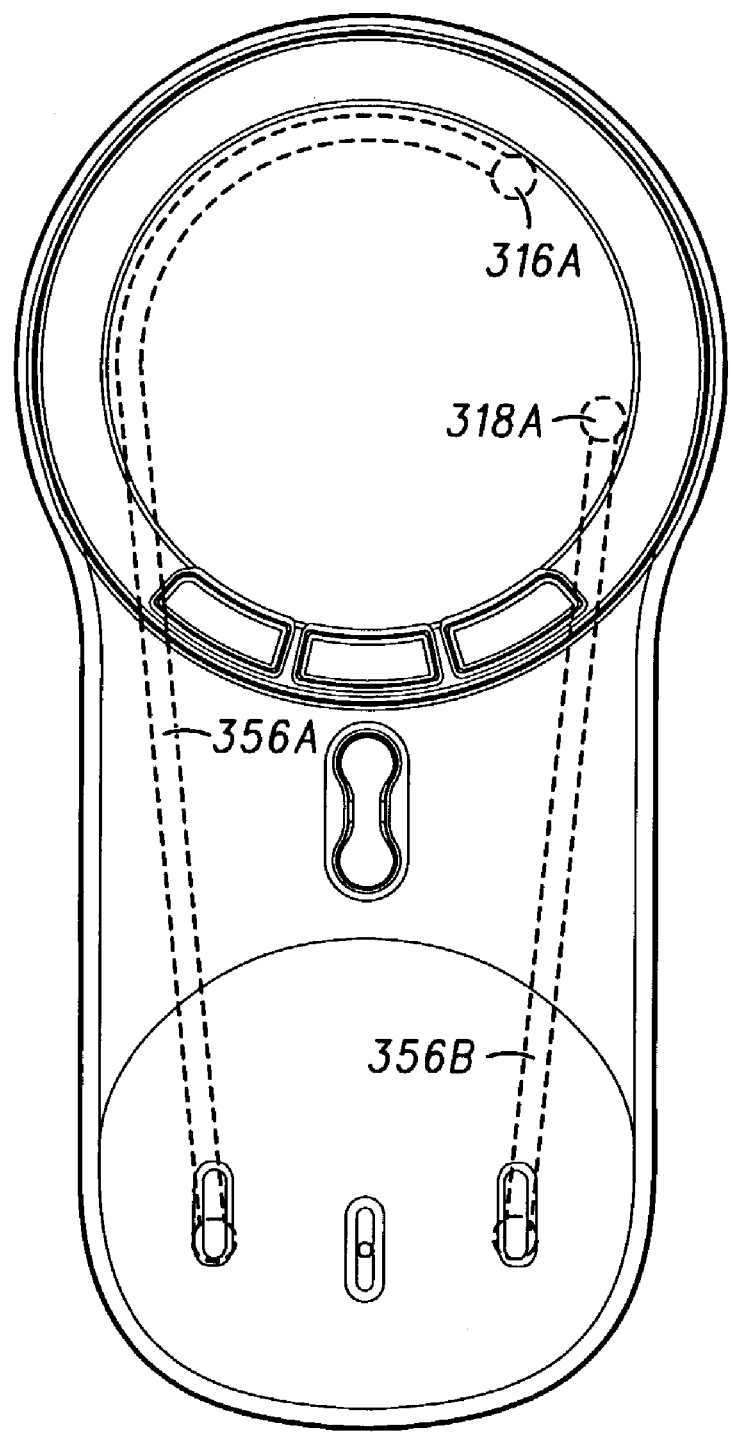
FIGS. 12A–12C are plan views of the radiotelephone of FIGS. 1 and 2 having two housing elements, that move between an opened and a closed position, similar to the plan views illustrated in 11A–11C, where the tension device includes at least two separate tension elements.
Figure 12B:
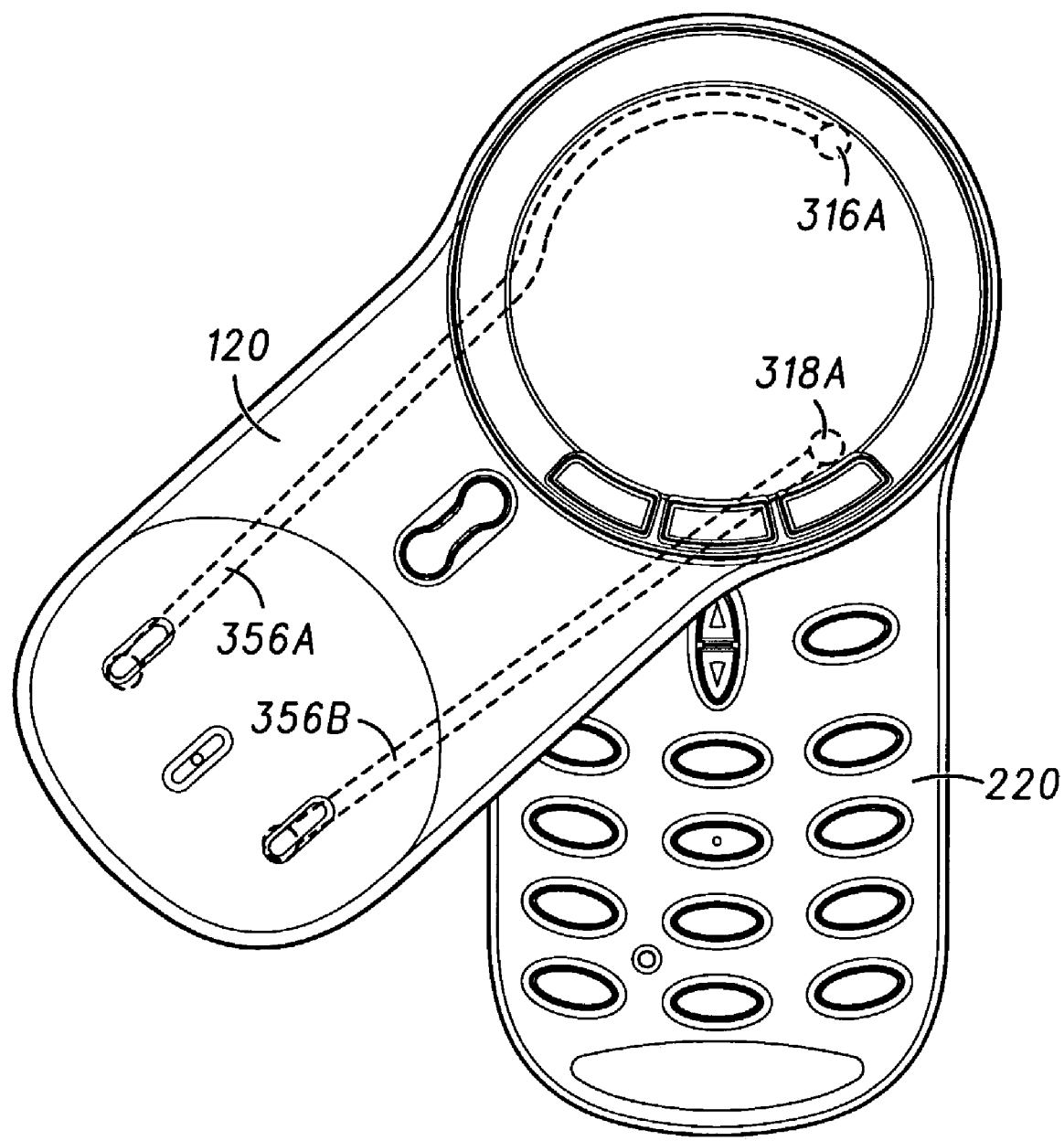
Figure 12C:
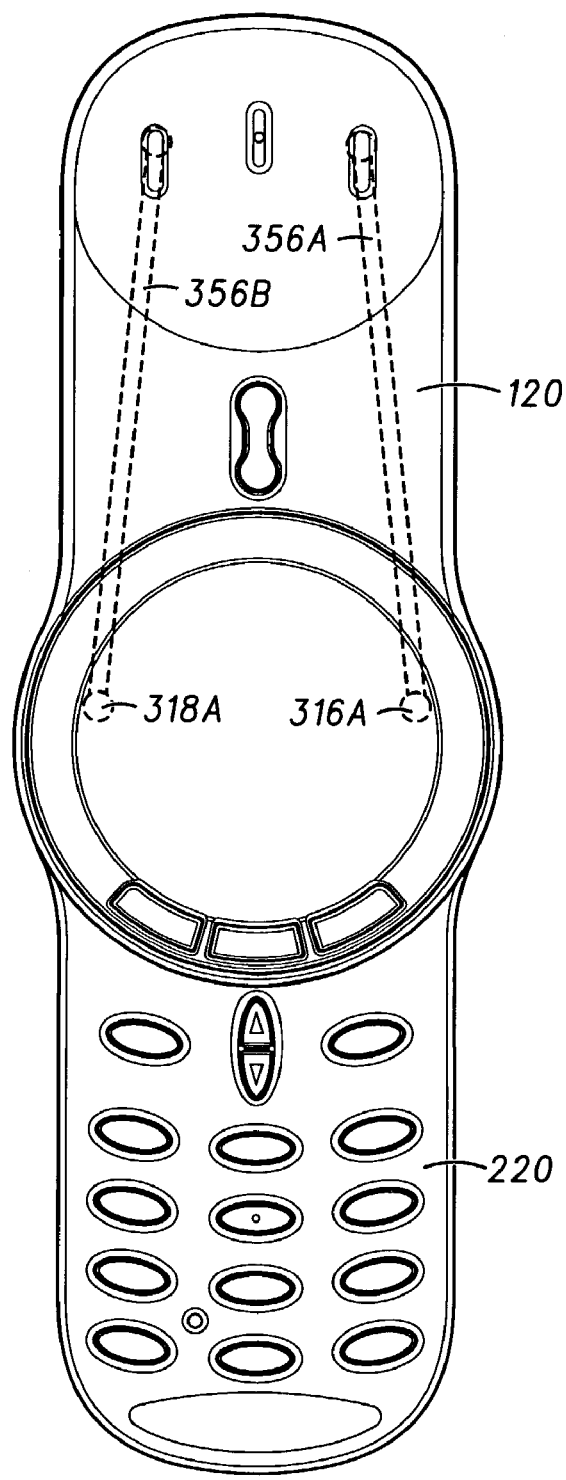

FIGS. 11A–11C illustrate a tension device that includes a single path length 356, which can be embodied by the use of a single spring. However it is possible that the overall path length could be segmented into two separate components 356A and 356B, as illustrated in FIGS. 12A–12C. In this instance, the tension device 306 may be embodied by a pair of springs, each coupled to a corresponding one of the transports, 302, 304, which would both bias the relative rotation of the housings 120, 220, so as to minimize each of the path lengths. In this instance, it may be beneficial to balance the forces exerted by each of the components 356A and 356B of the tension device 306, in order to properly control the equilibrium of forces for establishing the opened position. Alternatively, the structure of the contact elements 308, 310 and the transports 302, 304 can be used to manage the relative position of the upper and lower housings in an opened position.

One skilled in the art will readily recognize that other forms for the tension device 306 is further possible without departing from the teachings of the present invention. For example, while the illustrated embodiment has made use of a spring and/or a pair of springs as part of the tension device 306, it will be readily apparent to one skilled in the art that other types of tension devices could be used. Furthermore the manner in which the tension device applies a force to the upper 120 and lower 220 housings could similarly involve alternative approaches. For example, a spring loaded pulley might be used to supply the necessary force, which might allow for greater flexibility in the placement of the tension device.

Figure 13:
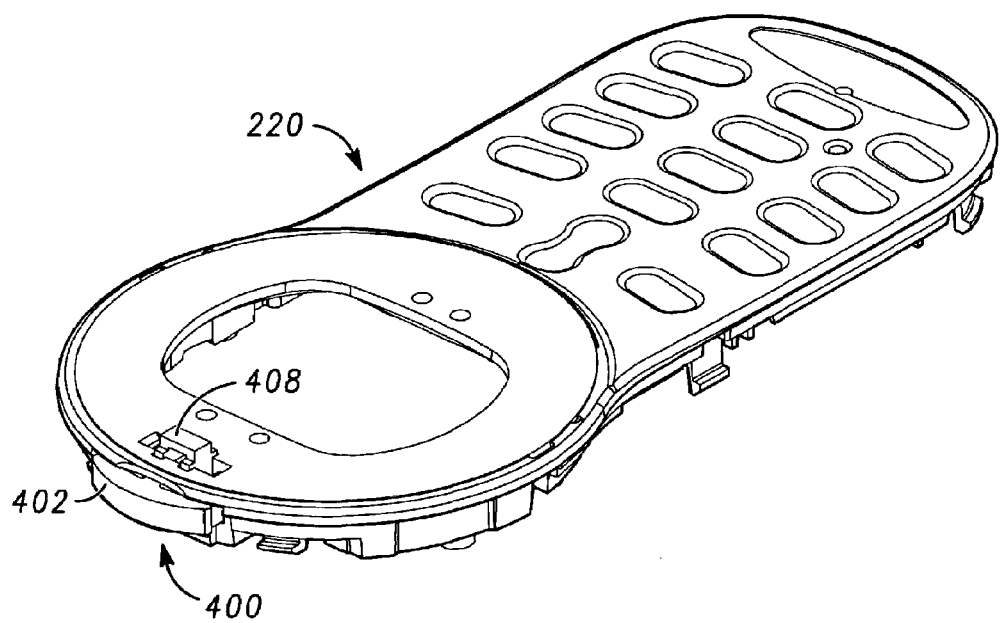
FIG. 13 is a perspective view of the lower housing including an engagement mechanism.
Figure 14:
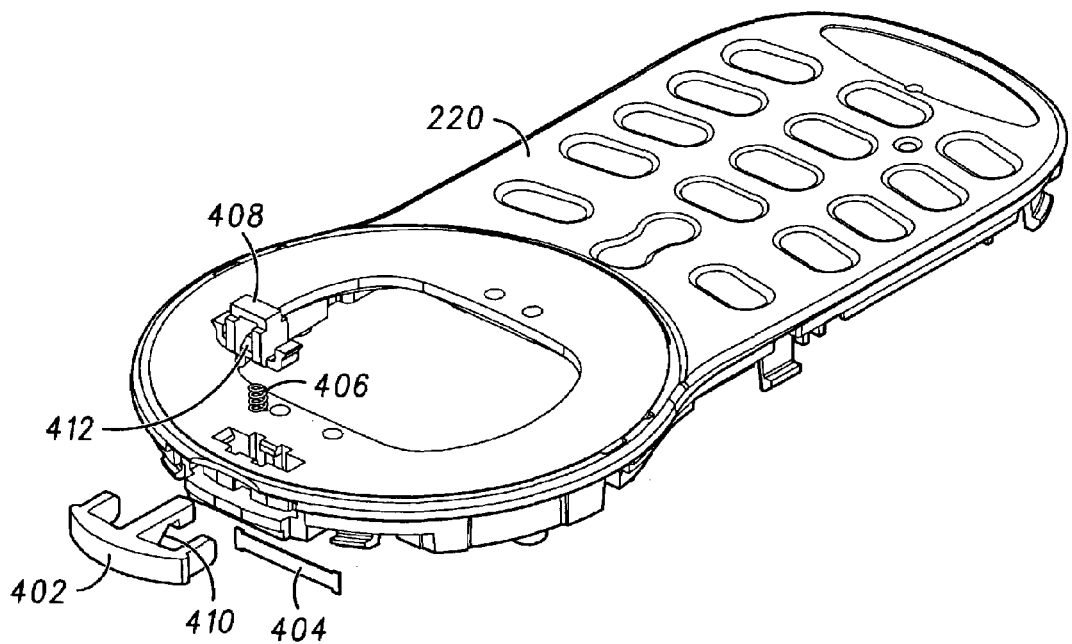
FIG. 14 is an exploded perspective view of the lower housing illustrated in FIG. 13, highlighting the elements of the engagement mechanism.
Figure 15:
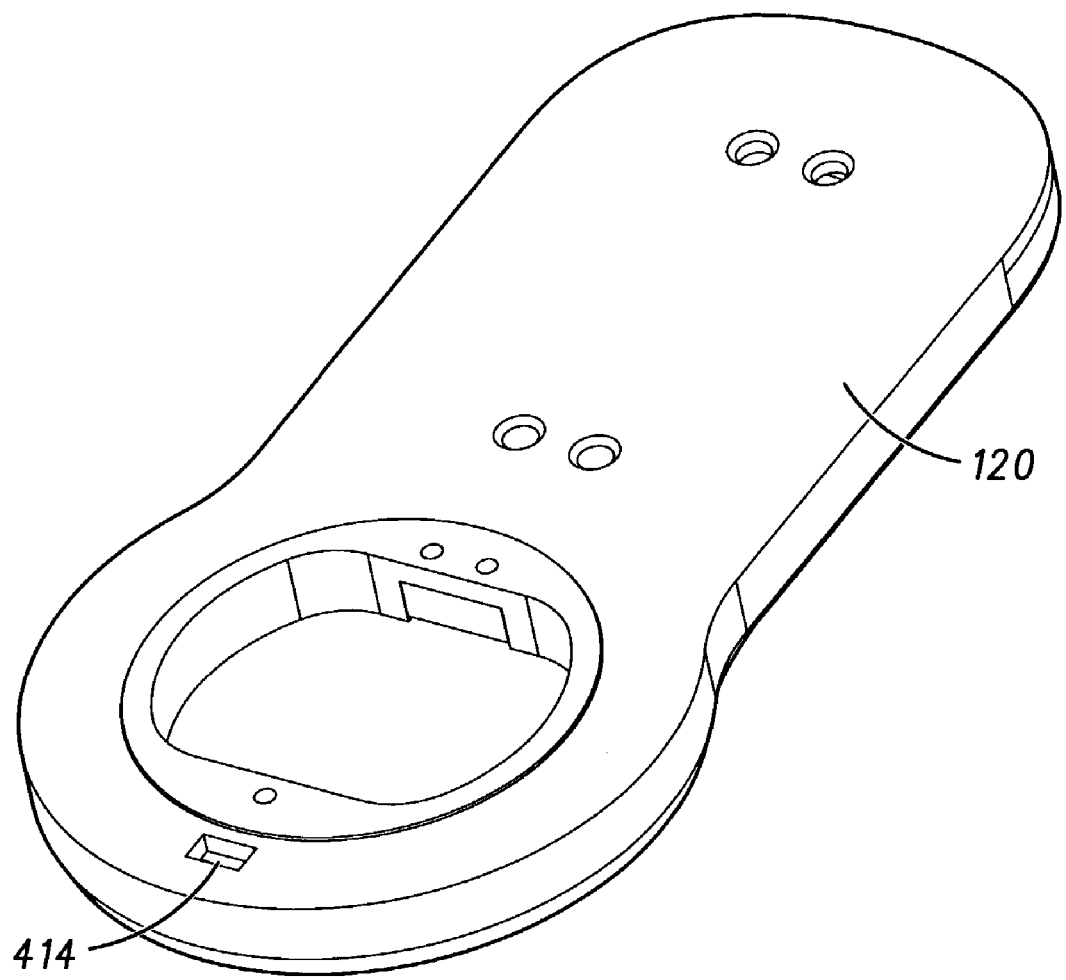
FIG. 15 is a perspective view of the upper housing, viewed from the back facing, illustrating a pocket within which the engagement mechanism of the lower housing, illustrated in FIGS. 13 and 14, releasably engages the upper housing.

FIG. 13 illustrates a perspective view of the lower housing 220 including at least portions of an engagement mechanism or latch 400. FIG. 14 illustrates an exploded perspective view of the lower housing 220 illustrated in FIG. 13, highlighting the elements of the latch 400, which are associated with the lower housing 220. The latch includes a button 402, a leaf spring 404, a coil spring 406 and a follower 408. The button 402 is biased outward by the leaf spring 404, and the follower 408 is biased upward by the coil spring 406.

An angled surface 410 on the button 402 engages a corresponding angled surface 412 on the follower 408. A portion of the button 402 extends outside of the lower housing 220, so as to be accessible by the user. Similarly, the follower 408 extends outside of the lower housing 220. However, instead of being accessible by a user, the follower 408 selectively engages a pocket opening 414 in the bottom side of the upper housing 120, illustrated in FIG. 15. The pocket opening 414 is aligned with the portion of the follower, which extends outside of the lower housing 220, when the relative rotation of the upper and lower housings 120, 220 is in a closed position. In the illustrated embodiment, the button 402 used to release the latch is located at the top of the device to more conveniently accommodate both a clockwise and a counter-clockwise opening direction.

When the latch 400 is engaged, the holding force of the follower 408 in conjunction with the pocket opening 414 is generally sufficient to resist the opening force of the tension device 306. However, in addition to using the push button 402 to affect the release of the latch 400, the latch may also be designed to be released, if the user exerts an external rotational force to the housing members in an attempt to manually rotate the upper and lower housings 120, 220.

Figure 16:
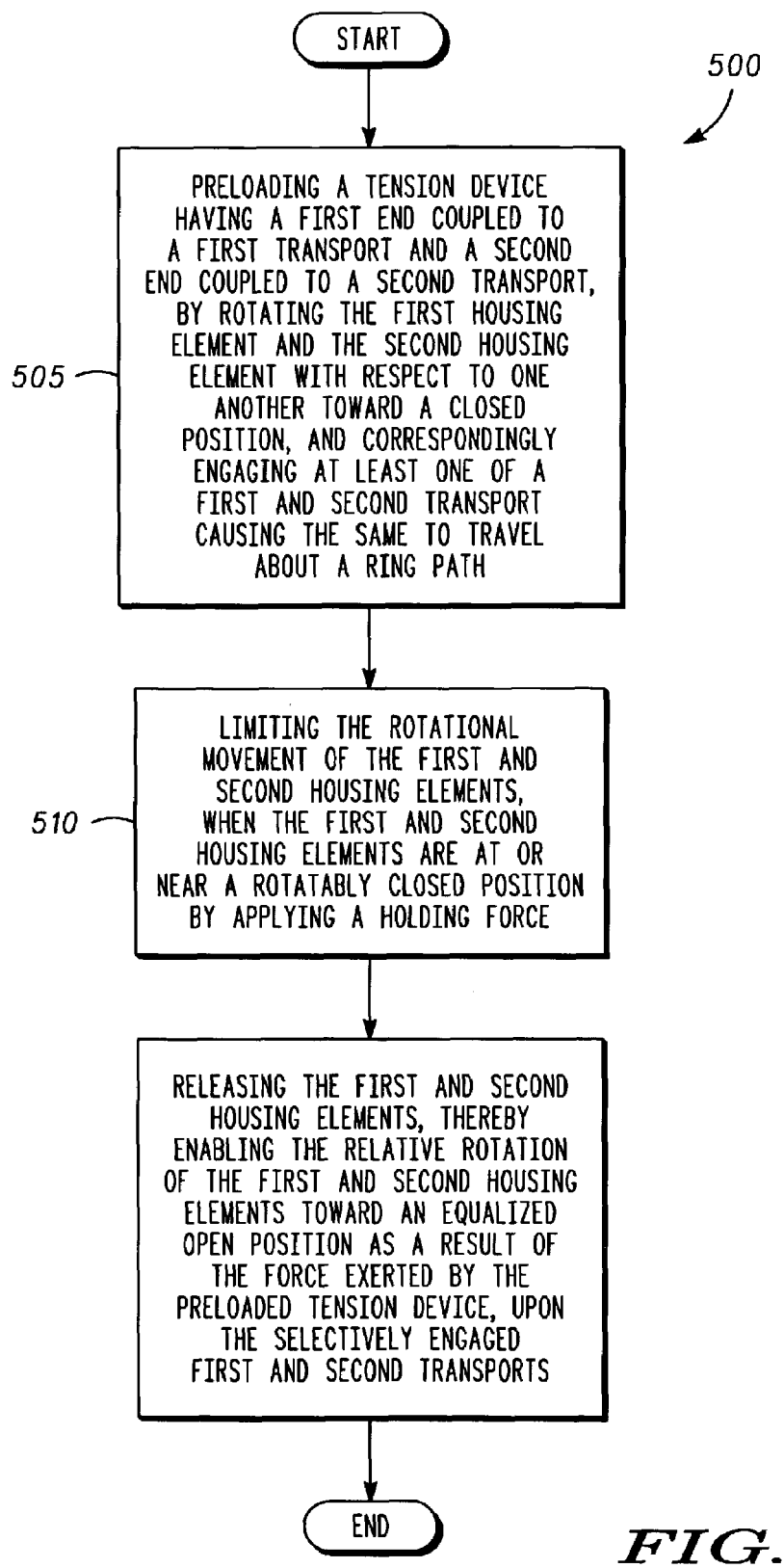
FIG. 16 is a flow diagram of a method for opening a first and a second housing element of a hand-held device using a self-opening mechanism, in accordance with at least one embodiment of the present invention.

FIG. 16 illustrates a flow diagram of a method for opening a first and a second housing element of a hand-held device using a self-opening mechanism, in accordance with at least one embodiment of the present invention. Generally, as illustrated in FIG. 16, the method 500 includes preloading 505 a tension device having a first end coupled to a first transport and having a second end coupled to a second transport by rotating the first and second element toward a more closed position from a more opened position. At least one of the first and second transports are engaged causing the same to travel about a ring path.

After the tension device is preloaded 505, and when the housing elements are at or near a rotatably closed position, the rotational movement of the housing elements are limited by applying 510 a holding force. In the embodiment illustrated in FIGS. 13–15, a holding force is applied by the latch 400, where the end of the follower 408 engages the notch 414. One skilled in the art will readily recognize that other structures, which are suitable for producing a holding force, are similarly possible without departing from the teachings of the present invention.

The first and second housing elements are then released 515, thereby enabling the relative rotation of the first and second housing elements toward an opened position. In the at least one illustrated embodiment noted above, the first and second housing elements, corresponding to the upper housing 120 and the lower housing 220, can be released when the button 402 of the latch 400 is pressed by the user. When the button is pressed, the follower 408 is disengaged from said notch 414. Alternatively, the upper housing 120 and the lower housing 220 can be released when an external manual opening force is initially applied to one or both of the first and second housings 120, 220 which, when added to the force applied by the preloaded tension device 306, overcomes the holding force applied to the first and second housings 120, 220. The tension device then acts upon both of the first and second housings to rotate the two toward a rotatably opened position.

Generally, in the preferred embodiment, the opened and closed position differ from one another by approximately 180°. However in some instances, the difference can be more or less. For example, in some instances a difference less than 180° might allow the radiotelephone to follow more closely the contour of a user's face, where one end of the opened phone, which produces an audio output, is proximate to the user's ear, and where the other end of the opened phone, which receives an audio input, is proximate the user's mouth.

The method additionally provides for the first and second housing elements to be returned to a non-rotated position. In at least some instances, this requires the manual application of a force by the user, which counteracts the force produced by the tension device. In at least the illustrated embodiment, returning the first and second housing element to a closed position serves to preload the tension device.

While the, above described, self operating opening mechanism for use in a hand-held electronic device is completely mechanical, alternative approaches could introduce electromechanical elements such as motors or linear actuators without departing from the scope of the present invention. However, one of the advantages to an all mechanical approach is that the all mechanical opening mechanism will not need to draw energy from a self contained power source, like a battery, when the mechanism is being used to open or close the device. This allows more of the energy stored in the power source to be used for the other operations of the device, such as the transmission and reception of a wireless signal.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A mechanism for rotating at least a first and a second housing element of a device with respect to one another, where the first and second housing elements have a common axis of rotation, which is substantially perpendicular to a front surface of the device, the first housing element including a ring path, which extends at least partly around said axis of rotation at a distance away from the axis of rotation, said mechanism comprising:
   a first transport and a second transport, which are each located on and separately travel about the ring path, each transport having a corresponding contact point and connection point;
   a tension device having a first end coupled to the connection point of the first transport, and a second end coupled to the connection point of the second transport;
   a first contact element fixed relative to the first housing element;
   a second contact element fixed relative to the second housing element; and
   an engagement member, engaged to one of the first and second housing elements and releasably engaged with the other one of the first and second housing elements, which limits rotational movement, when the first and second housing elements are at or near a rotatably closed position; and
   wherein the contact points of the first and second transports are located on opposite sides of first and second contact elements of the first and second housing elements along the ring path, which selectively engage alternative ones of the contact points of the first and second transports and thereby limit the rotation of the transports relative to the first and second housing elements in the direction that the contact elements of the first and second housing elements engage the contact points.

2. A mechanism in accordance with claim 1 wherein the first contact element coincides with the second contact element along the ring path, when the first and second housing elements are at or near a rotatably opened position, and which diverge as the first and second housing elements rotate away from the opened position.

3. A mechanism in accordance with claim 2 wherein when the first and second housing elements are rotated away from the opened position, and the first and second contact elements diverge, each contact element engages the corresponding contact point of the first and second transport elements in the direction that the housing elements rotate with respect to one another.

4. A mechanism in accordance with claim 1 wherein at least a portion of the tension device extends along a tension device path which diverges from the ring path and extends along at least a part of the length of the first housing element along a first leg of the path and back toward the ring path along a second leg of the path.

5. A mechanism in accordance with claim 4 wherein the portion of the tension device, which extends along a tension device path includes a portion of the tension device located between the end points of the tension device.

6. A mechanism in accordance with claim 1 wherein the second housing element can be rotated relative to the first housing position from a rotatably opened to a rotatably closed position in either a clockwise or a counter-clockwise direction.

7. A mechanism in accordance with claim 6 wherein the contact element of the second housing element engages one of the contact points of the first and second transports when the second housing element is rotated in a clockwise direction relative to the first housing position, and the contact element of the second housing element engages the other one of the contact points of the first and second transports when the second housing element is rotated in a counter-clockwise direction relative to the first housing position, thereby causing the corresponding transport to travel about the ring path with the second housing element.

8. A mechanism in accordance with claim 7 wherein when the first and second transports travel about the ring path with the engaged contact elements of the corresponding housing elements, the end points of the tension device coupled to the first and second transports are moved a varying distance apart.

9. A mechanism in accordance with claim 1 wherein the first and second transports includes corresponding rings, which are located on and rotate about the ring path.

10. A mechanism in accordance with claim 1 wherein the tension device includes a spring.

11. A mechanism in accordance with claim 1 wherein the tension device includes two or more springs.

12. A mechanism in accordance with claim 1 wherein said device is a hand-held device.

13. A mechanism in accordance with claim 1 wherein said device is an electronic device.

14. A mechanism in accordance with claim 13 wherein said electronic device is a wireless communication device.

15. A mechanism in accordance with claim 14 wherein one of first and second housing elements includes a microphone adapted to be positioned proximate the users mouth, and the other one of the first and second housing elements includes a speaker adapted to be positioned proximate the users car, when the first and second housing elements are at or near a rotatably opened position.

16. A method of opening a first and a second housing element of a hand-held device having an axis of rotation, which is substantially perpendicular to a front surface of the device using a self-opening mechanism comprising:
   preloading a tension device having a first end coupled to a first transport and a second end coupled to a second transport, wherein the first and second transports are located on and separately travel about a ring path, which extends at least partly around a common axis of rotation at a distance away from the common axis of rotation, by rotating the first housing element and the second housing element with respect to one another toward a closed position, and correspondingly engaging at least one of a first and second transport, causing the same to travel about the ring path;

limiting the rotational movement of the first and second housing elements, when the first and second housing elements are at or near a rotatably closed position by applying a holding force applied by an engagement member;

releasing the first and second housing elements, thereby enabling the relative rotation of the first and second housing elements toward an equalized open position as a result of the force exerted by the preloaded tension device upon the at least one of the first and second transports, which is selectively engaged with the respective housing element.

17. A method in accordance with claim 16 wherein preloading a tension device includes moving the first transport and a corresponding first end of a spring coupled to the first transport along the ring path, relative to the second transport and a corresponding second end of the spring coupled to the second transport, such that the first end of the spring is further away from the second end of the spring along the path of travel of the spring.

18. A method in accordance with claim 16 wherein releasing the first and second housing elements includes applying an opening force to the first and second housing elements, which in addition to the force applied by the preloaded tension device, overcomes the holding three applied by the engagement member.

19. A method in accordance with claim 16 wherein releasing the first and second housing elements includes applying a release force to the engagement member which biases the engagement member in a direction that reduces the holding force below a level where the force applied by the preloaded tension device can overcome the holding force.

20. A method in accordance with claim 16 wherein the minimum path length of the tension device coincides with the first and second housing elements being at or near a rotatably opened position.

21. A method in accordance with claim 16 wherein preloading a tension device includes rotating the first and second housing elements with respect to one another in one of both a clockwise or a counter-clockwise direction.

22. A method in accordance with claim 21 wherein if the first and second housing elements are rotated, with respect to one another, in a clockwise direction the second housing element engages and causes to travel about the ring path one of the first and second transports relative to the first housing element, and if the first and second housing elements are rotated in a counter-clockwise direction the second housing element engages and causes to travel about the ring path the other one of the first and second transports relative to the first housing element.

23. A method in accordance with claim 16 wherein a transport traveling about a ring path includes a ring rotating about a ring path.

24. A method in accordance with claim 16 wherein enabling the relative rotation of the first and second housing elements toward an equalized open position includes enabling the relative rotatation of the first and second housing elements to a substantially fully open position.

25. A method of opening a first and a second housing element of a band-held device having an axis of rotation, which is substantially perpendicular to a front surface of the device using a self-opening mechanism comprising:

preloading a tension device having a first end fixedly coupled to a first transport and a second end fixedly coupled to a second transport, wherein the first and second transports are located on and separately travel about a ring path, which extends at least partly around a common axis of rotation at a distance away from the common axis of rotation, by rotating the first housing element and the second housing element with respect to one another toward a closed position, and correspondingly engaging at least one of a first and second transport, causing the same to travel about the ring path;

limiting the rotational movement of the first and second housing elements, when the first and second housing elements are at or near a rotatably closed position by applying a holding force applied by an engagement member;

releasing the first and second housing elements, thereby enabling the relative rotation of the first and second housing elements toward an open position as a result of the force exerted by the preloaded tension device upon the at least one of the first and second transports, which is selectively engaged with the respective housing element.

* * * * *